(12) United States Patent
Ogata et al.

(10) Patent No.: US 9,373,451 B2
(45) Date of Patent: Jun. 21, 2016

(54) ELECTRONIC COMPONENT MANUFACTURING APPARATUS AND ELECTRONIC COMPONENT MANUFACTURING METHOD

(71) Applicant: Murata Manufacturing Co., Ltd., Nagaokakyo-shi, Kyoto-fu (JP)

(72) Inventors: Katsunori Ogata, Nagaokakyo (JP); Miyuki Mizukami, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/478,085

(22) Filed: Sep. 5, 2014

(65) Prior Publication Data
US 2014/0373323 A1    Dec. 25, 2014

Related U.S. Application Data

(62) Division of application No. 13/338,339, filed on Dec. 28, 2011, now Pat. No. 8,943,680.

(30) Foreign Application Priority Data

Dec. 29, 2010  (JP) .................................. 2010-294525

(51) Int. Cl.
*H01G 13/00*    (2013.01)
*H01G 4/232*   (2006.01)
*H01G 4/30*     (2006.01)

(52) U.S. Cl.
CPC ............. *H01G 13/006* (2013.01); *H01G 4/232* (2013.01); *H01G 4/30* (2013.01); *H01G 13/00* (2013.01); *Y10T 29/43* (2015.01); *Y10T 29/5313* (2015.01); *Y10T 29/53174* (2015.01); *Y10T 29/53178* (2015.01)

(58) Field of Classification Search
CPC ..... H01G 13/00; H01G 13/006; H01G 4/232; H01G 4/30; Y10T 29/43; Y10T 29/5313
See application file for complete search history.

(56) References Cited

U.S. PATENT DOCUMENTS

| 8,943,680 B2 * | 2/2015 | Ogata | ................... H01G 4/232 269/21 |
| 2010/0146778 A1 * | 6/2010 | Dooka | ................... H01G 4/232 29/832 |

FOREIGN PATENT DOCUMENTS

CN            101752083 A       6/2010

OTHER PUBLICATIONS

Ogata et al., "Electronic Component Manufacturing Apparatus and Electronic Component Manufacturing Method", U.S. Appl. No. 13/338,339, filed Dec. 28, 2011.

* cited by examiner

*Primary Examiner* — Minh Trinh
(74) *Attorney, Agent, or Firm* — Keating & Bennett, LLP

(57) ABSTRACT

An electronic component manufacturing method includes the steps of preparing at least one electronic component chip having a first surface and a second surface opposite each other; holding the electronic component chip between a first plate and a second plate such that the first surface is in contact with a first elastic layer of the first plate and the second surface is in contact with a second elastic layer of the second plate; and turning the electronic component chip by relatively moving the first and second plates in a planar direction thereof using a planar movement mechanism and moving the first and second plates in accordance with a turning path of the electronic component chip using the planar movement mechanism and a vertical movement mechanism.

3 Claims, 10 Drawing Sheets

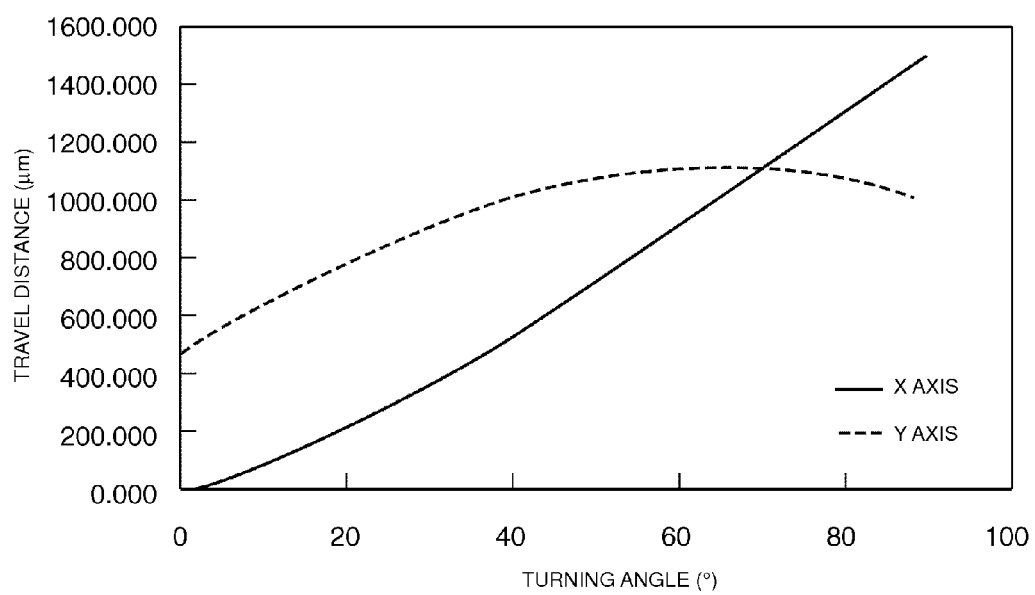

ELECTRONIC COMPONENT MANUFACTURING APPARATUS AND ELECTRONIC COMPONENT MANUFACTURING METHOD

BACKGROUND OF THE INVENTION

1. Field of the Invention

The present invention relates to electronic component manufacturing apparatuses and electronic component manufacturing methods used, for example, to apply conductive paste to a plurality of end faces of electronic component chips. In particular, the present invention relates to an electronic component manufacturing apparatus in which electronic component chips are held between a pair of opposite plates and turned by relatively moving the pair of plates, and also relates to an electronic component manufacturing method using the electronic component manufacturing apparatus.

2. Description of the Related Art

In an electronic component, such as a monolithic capacitor, electrodes are formed on a plurality of surfaces of an electronic component chip. As examples of electrode forming methods, methods for applying and baking conductive paste have been widely used. For efficient application of conductive paste, a variety of methods have been proposed.

Japanese Unexamined Patent Application Publication No. 2000-299145 discloses a method in which electrodes are formed on about four side faces of an electronic component chip having a substantially quadrangular prismatic shape. For application of conductive paste to different side faces of such an electronic component chip, this method uses an electronic component manufacturing apparatus illustrated in FIG. 10.

In an electronic component manufacturing apparatus 1001 illustrated in FIG. 10, an elastic material layer 1003 is formed on a lower surface of a retaining plate 1002. A holder plate 1004 is disposed below the retaining plate 1002. The holder plate 1004 is made of elastic material and provided with a through hole 1004a. An electronic component chip 1005 is press-fitted into and held in the through hole 1004a.

As illustrated in FIG. 10, the electronic component chip 1005 is held between the elastic material layer 1003 and the holder plate 1004. In this state, the retaining plate 1002 is moved, as indicated by an arrow, in a planar direction thereof with respect to the holder plate 1004. As a result, the electronic component chip 1005 is turned and press-fitted into the through hole 1004a of the holder plate 1004. Thus, one side face of the electronic component chip 1005 can be exposed on the upper surface of the holder plate 1004. This facilitates application of conductive paste to the exposed side face of the electronic component chip 1005.

Japanese Unexamined Patent Application Publication No. 2000-299145 states that electrodes can be formed on about four side faces of the electronic component chip 1005 by repeating the step of turning the electronic component chip 1005 using the retaining plate 1002 and the holder plate 1004.

Japanese Unexamined Patent Application Publication No. 2010-141145 discloses a technique which also involves turning an electronic component chip. In the technique disclosed in this document, one side face of an electronic component chip is held to an adhesive surface of a first elastic member by adhesive force. In this state, a paste layer is formed on the other side face of the electronic component chip. Then, a second elastic member having a non-adhesive surface is pressed into contact with the electronic component chip and slid in a planar direction thereof with respect to the first elastic member. This allows the electronic component chip to be turned about 180 degrees. After the electronic component chip is turned about 180 degrees, the other side face of the electronic component chip is held to the adhesive surface of the first elastic member. Thus, a paste layer can be formed on the one side face of the electronic component chip.

In the electronic component manufacturing apparatus described in Japanese Unexamined Patent Application Publication No. 2000-299145, the electronic component chip 1005 is turned about 90 degrees and press-fitted into the through hole 1004a of the holder plate 1004. This means that for application of paste to another side face, the electronic component chip 1005 needs to be taken out of the through hole 1004a and turned again.

Japanese Unexamined Patent Application Publication No. 2010-141145 describes the fact that an electronic component chip is turned about 180 degrees for application of electrode paste to opposite side faces of the electronic component chip. However, Japanese Unexamined Patent Application Publication No. 2010-141145 does not describe in detail any specific method or apparatus for turning the electronic component chip.

Japanese Unexamined Patent Application Publication No. 2010-141145 describes the technique in which electronic component chips are pressed into contact with an elastic member having an adhesive surface. In this technique, as the size of the electronic component chips decreases, it becomes difficult to accurately turn the electronic component chips due to, for example, deformation of the elastic member. Moreover, it is difficult in practice to check whether such small electronic component chips have been properly turned, because of a small distance between elastic members on both sides of the electronic component chips.

SUMMARY OF THE INVENTION

In view of the current circumstances of the related art described above, an object of the present invention is to provide an electronic component manufacturing apparatus and an electronic component manufacturing method using the electronic component manufacturing apparatus in which it is possible to reliably turn electronic component chips even if they are small in size.

An electronic component manufacturing apparatus according to preferred embodiments of the present invention includes a first plate having a first elastic layer on one side thereof; a second plate having a second elastic layer on one side thereof; a planar movement mechanism configured to relatively move the first and second plates in a planar direction thereof in a state where at least one electronic component chip adhering, at one surface thereof, to the first elastic layer is held between the first and second elastic layers facing each other; and a vertical movement mechanism configured to move, in conjunction with the planar movement mechanism, at least one of the first and second plates in the planar direction and a vertical direction in accordance with a turning path of the electronic component chip turned between the first and second elastic layers.

In a specific aspect of the electronic component manufacturing apparatus according to the preferred embodiments of the present invention, the planar movement mechanism and the vertical movement mechanism each may have a motor as a drive source and each may be provided with a detecting mechanism that detects changes in torque of the motor.

An electronic component manufacturing method according to preferred embodiments of the present invention is an electronic component manufacturing method using the electronic component manufacturing apparatus configured in accordance with the preferred embodiments of the present invention, the method including the steps of preparing at least one electronic component chip having a first surface and a second surface opposite each other; holding the electronic component chip between the first and second plates such that the first and second surfaces are in contact with the first and second elastic layers, respectively; and turning the electronic component chip by relatively moving the first and second plates in the planar direction using the planar movement mechanism and moving the first and second plates in accordance with a turning path of the electronic component chip using the planar movement mechanism and the vertical movement mechanism.

In a specific aspect, the electronic component manufacturing method according to the preferred embodiments of the present invention may further include the steps of, before relatively moving the first and second plates in the planar direction, bringing the first and second plates closer to each other by driving the vertical movement mechanism such that the first and second surfaces of the electronic component chip dig into the first and second elastic layers, respectively; relatively moving the first and second plates in the planar direction by a predetermined distance smaller than or equal to maximum displacements of the first and second plates in the vertical direction, the displacements being made when the first and second plates are brought closer to each other; and after relatively moving the first and second plates in the planar direction by the predetermined distance, turning the electronic component chip using the planar movement mechanism and the vertical movement mechanism such that the electronic component chip is turned along the turning path of the electronic component chip.

In another specific aspect of the electronic component manufacturing method according to the preferred embodiments of the present invention, the planar movement mechanism and the vertical movement mechanism each may have a motor as a drive source, and each may detect a torque of the motor using a detecting mechanism.

In the electronic component manufacturing apparatus and the electronic component manufacturing method according to the preferred embodiments of the present invention, in a state where at least one electronic component chip having a pair of opposite surfaces is held between the first and second plates, with one surface adhering to the adhesive surface of the first plate and the other surface being in contact with the second plate, at least one of the first and second plates can be moved in accordance with the turning path of the electronic component chip. It is thus possible to turn the electronic component chip. That is, since it is possible to reliably turn the electronic component chip along its turning path, the electronic component chip can be properly turned even if the electronic component chip is small in size or even if the elastic layers are deformed by being pressed into contact therewith by the electronic component chip.

The electronic component manufacturing apparatus and the electronic component manufacturing method according to the preferred embodiments of the present invention are suitable for use in the process of applying paste to opposite end faces of electronic component chips, and make it possible to reliably apply paste to both end faces of the electronic component chips.

Other features, elements, characteristics and advantages of the present invention will become more apparent from the following detailed description of preferred embodiments of the present invention with reference to the attached drawings.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a graph showing a relationship between turning angle and the travel distances of first and second plates in Z-axis and X-axis directions for realizing a turning path α according to the preferred embodiment of the present invention;

DETAILED DESCRIPTION OF THE PREFERRED EMBODIMENTS

The present invention will be clarified by describing specific preferred embodiments of the present invention with reference to the drawings.

Figure 2A:
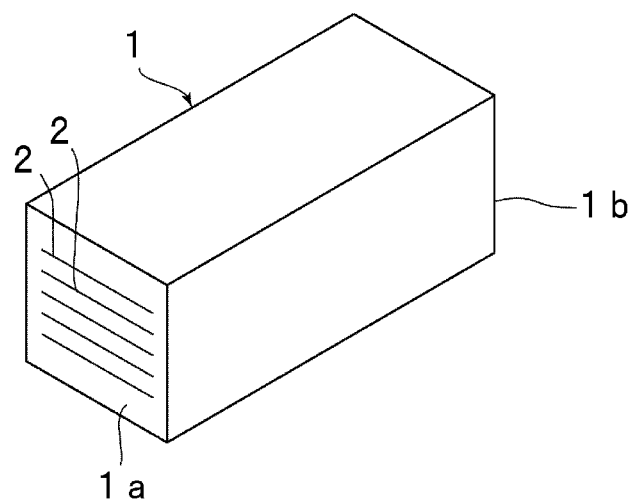
FIG. 2A is a perspective view of an electronic component chip to be turned by an electronic component manufacturing method according to the preferred embodiment of the present invention.

In an electronic component manufacturing method of the present preferred embodiment, conductive pastes are applied to and baked on both end faces of an electronic component chip 1 illustrated in FIG. 2A. The electronic component chip 1 is a ceramic sintered body having a plurality of internal electrodes 2. In the ceramic sintered body, the internal electrodes 2 illustrated in FIG. 2A and a plurality of other internal electrodes are alternately stacked, with ceramic layers interposed between adjacent internal electrodes. The plurality of internal electrodes 2 are exposed to an end face 1a of the electronic component chip 1. The plurality of other internal electrodes alternately stacked with the plurality of internal electrodes 2, as described above, are exposed to an end face 1b of the electronic component chip 1. The end face 1a and the end face 1b correspond to a first surface and a second surface, respectively, of the present invention.

Figure 2B:
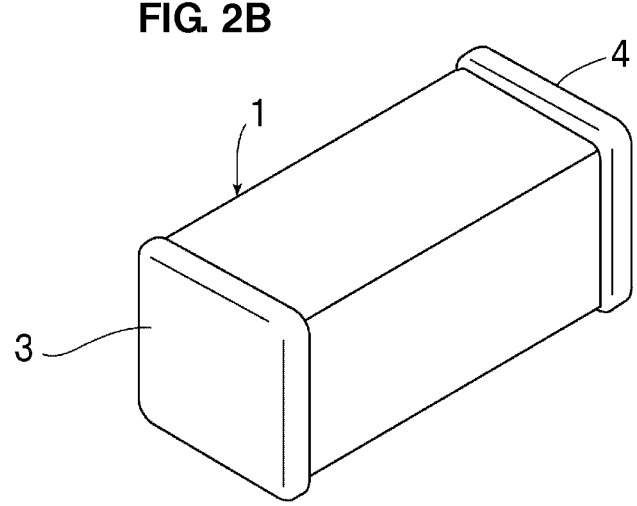
FIG. 2B is a perspective view of the electronic component chip, with both end faces thereof coated with conductive pastes by the electronic component manufacturing method.

As illustrated in FIG. 2B, in the present preferred embodiment, conductive pastes 3 and 4 are applied to cover the end faces 1a and 1b, respectively. The electronic component chip is turned for application of the conductive pastes 3 and 4 thereto. Specifically, after application of the conductive paste 3 to the end face 1a, the electronic component chip 1 is turned about 180 degrees to apply the conductive paste 4 to the end face 1b. The step of turning the electronic component chip 1 will now be described in detail.

Figure 3A:
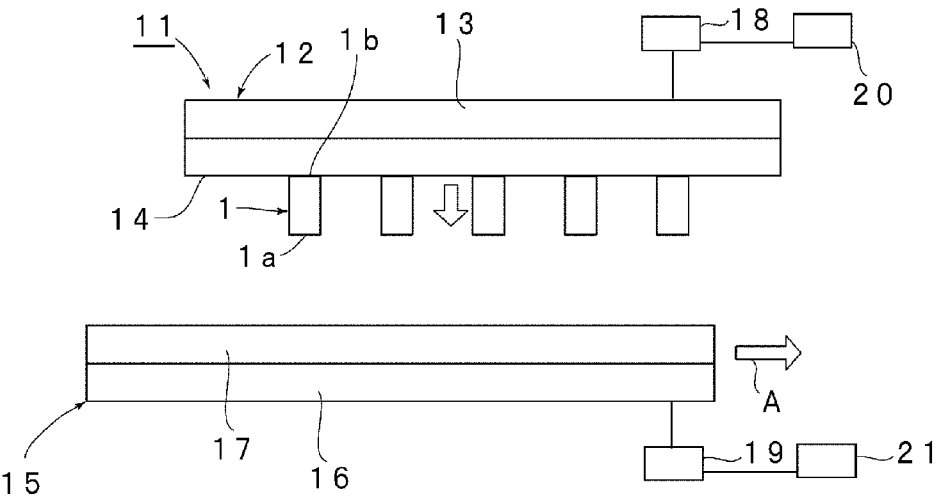
FIG. 3A to FIG. 3C are schematic front views for explaining the electronic component manufacturing method according to the preferred embodiment of the present invention.

An electronic component manufacturing apparatus 11 illustrated in FIG. 3A is used in the present preferred embodiment. The electronic component manufacturing apparatus 11 includes a first plate 12. The first plate 12 includes a support plate portion 13 made of metal and a first elastic layer 14 formed on a lower surface of the support plate portion 13. The first elastic layer 14 has an adhesive force. A second plate 15 is disposed below the first plate 12. The second plate 15 includes a support plate portion 16 made of metal and a second elastic layer 17 formed on an upper surface of the support plate portion 16. In the present preferred embodiment, the first plate 12 is connected to a vertical movement mechanism 18, which moves the first plate 12 upward and downward.

The second plate 15 is connected to a planar movement mechanism 19, which moves the second plate 15 in a planar direction thereof.

The vertical movement mechanism 18 may be a known reciprocating drive source. For example, such a reciprocating drive source may be one which includes a motor and a drive-direction converting mechanism connected to the motor. The drive-direction converting mechanism is configured to convert the direction of rotary drive force of the motor into a reciprocating direction. Alternatively, a reciprocating drive source, such as an air cylinder or a hydraulic cylinder, may be used. For easy control of the travel distance, however, it is preferable that a reciprocating drive source including a motor be used.

The planar movement mechanism 19 may also be a reciprocating drive source, as in the case of the vertical movement mechanism 18. Again, since the travel distance of the second plate 15 can be controlled with great precision, it is preferable that a reciprocating drive source including a motor and a drive-direction converting mechanism be used. In the present preferred embodiment, the vertical movement mechanism 18 and the planar movement mechanism 19 each include a motor and a drive-direction converting mechanism connected to the motor.

In the electronic component manufacturing method of the present preferred embodiment, as illustrated in FIG. 3A, a plurality of electronic component chips 1 are held on the lower surface of the first elastic layer 14. In other words, the end faces 1b of the electronic component chips 1 are secured to the lower surface of the first elastic layer 14 by adhesive force. While not shown in FIG. 3A, a conductive paste is applied in advance to the end faces 1a located below the end faces 1b. Specifically, by dipping the electronic component chips 1 secured to the first plate 12 into a conductive paste and raising them, the conductive paste is applied to the end faces 1a of the electronic component chips 1. In the present preferred embodiment, the electronic component chips 1 are held between the first and second plates 12 and 15 and turned about 180 degrees, so that the end faces 1b of the electronic component chips 1 are exposed.

For this, first, the first plate 12 illustrated in FIG. 3A is lowered by the vertical movement mechanism 18.

Figure 3B:
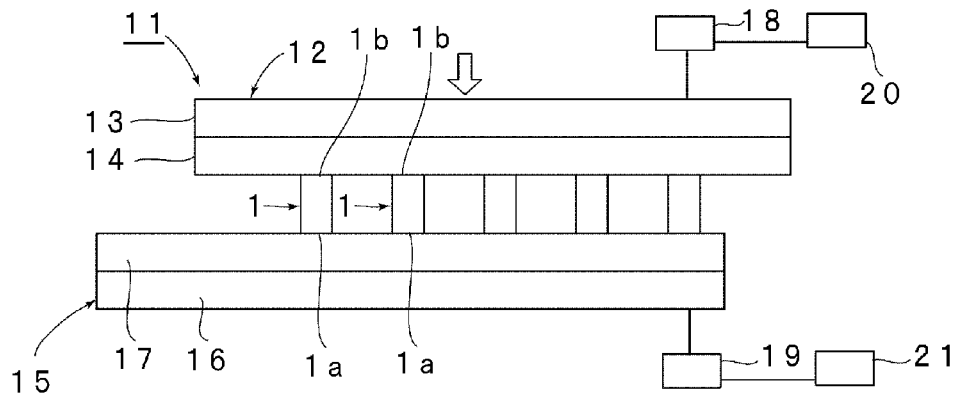

Thus, as illustrated in FIG. 3B, the end faces 1a of the electronic component chips 1 are secured to the second elastic layer 17 of the second plate 15. This means that the plurality of electronic component chips 1 are held between the first and second plates 12 and 15.

Figure 3C:
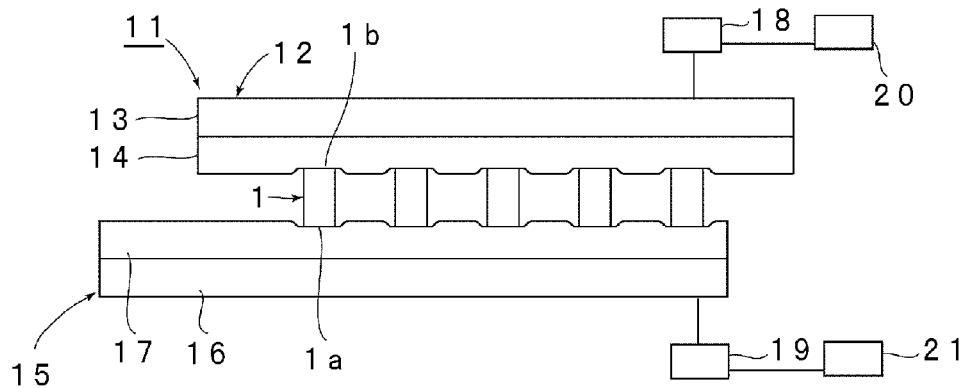

Next, the vertical movement mechanism 18 is driven to press the first plate 12 downward. As illustrated in FIG. 3C, this elastically deforms the first and second elastic layers 14 and 17 and causes the end faces 1a and 1b of the electronic component chips 1 to dig into the second and first elastic layers 17 and 14, respectively.

Figure 1A:
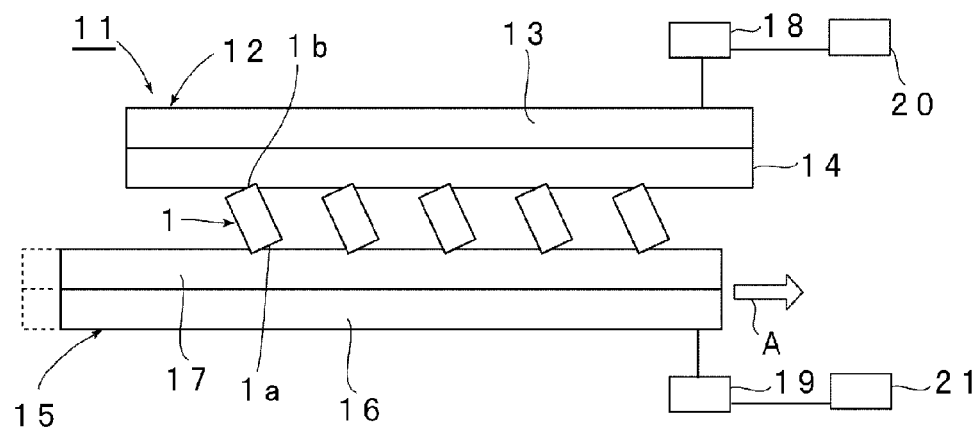
FIG. 1A is a schematic front view for explaining a step of turning electronic component chips by moving a second plate according to a preferred embodiment of the present invention.
Figure 1B:
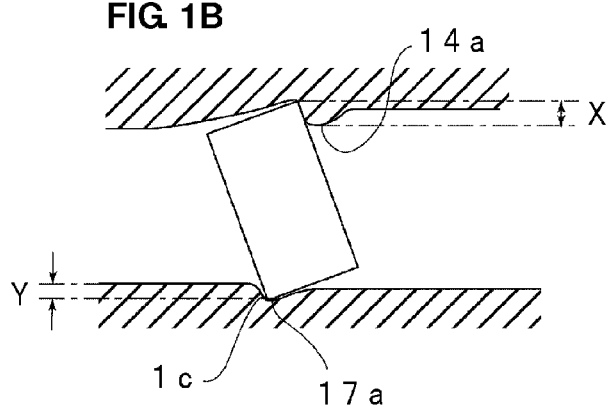
FIG. 1B is a partial cutaway enlarged front cross-sectional view illustrating a relationship between an electronic component chip and first and second elastic layers.

Next, as illustrated in FIG. 1A, the second plate 15 is slightly moved by the planar movement mechanism 19 laterally as indicated by arrow A in FIG. 1A. This causes the electronic component chips 1 to be inclined in an oblique direction. Since the end faces 1a and 1b of the electronic component chips 1 have dug into the second and first elastic layers 17 and 14, respectively, the second and first elastic layers 17 and 14 are deformed by the lateral movement of the second plate 15. As illustrated in FIG. 1B, a protrusion 14a is formed in the first elastic layer 14 by the movement of the second plate 15 in the direction of arrow A in FIG. 1A.

A travel distance by which the second plate 15 is slightly moved in the direction of arrow A, as described above, is preferably smaller than or equal to maximum elastic displacements of the first and second elastic layers 14 and 17.

The maximum elastic displacements of the first and second elastic layers 14 and 17 refer to the maximum amounts by which the first and second elastic layers 14 and 17 are elastically deformed when the electronic component chips 1 are pressed and held between the first and second elastic layers 14 and 17. That is, when the electronic component chips 1 are pressed and held between the first and second elastic layers 14 and 17 firmly to a maximum extent that does not cause any damage to the electronic component chips 1, a displacement X in FIG. 1B is a maximum elastic displacement of the first elastic layer 14, and a displacement Y in FIG. 1B is a maximum elastic displacement of the second elastic layer 17.

The electronic component chips 1 can be reliably turned (as described below) by moving the second plate 15 in the direction of arrow A by a distance smaller than the maximum elastic displacements X and Y of the first and second elastic layers 14 and 17, respectively, and larger than or equal to about 40% of a width W of the electronic component chips 1. The electronic component chips 1 may not be turned completely if the second plate 15 is moved by a distance smaller than about 40% of the width W of the electronic component chips 1.

Figure 4:
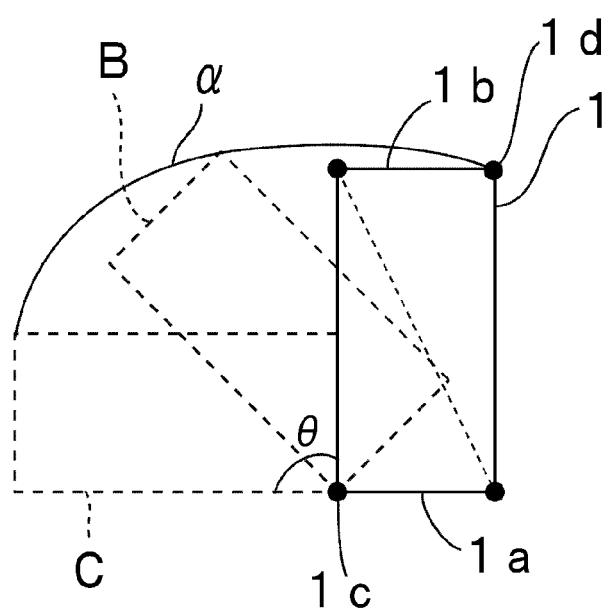
FIG. 4 is a schematic front view for explaining a step of turning the electronic component chip such that an angle θ is changed from about 90 degrees to about 0 degrees according to the preferred embodiment of the present invention.

The second plate 15 is further moved in the planar direction, that is, in the direction of arrow A in FIG. 1A with respect to the first plate 12. Additionally, the first plate 12 is moved in accordance with a turning path of the electronic component chips 1. As schematically illustrated in FIG. 4, when the electronic component chip 1 positioned as indicated by a solid line is turned to a position indicated by broken line B and further to a position indicated by broken line C, the electronic component chip 1 is turned about a ridge 1c located at the rear of the end face 1a in the direction of travel of the second plate 15. As illustrated in FIG. 1B, in the present preferred embodiment, the protrusion 14a is formed in the first elastic layer 14, a depression 17a is formed in the second elastic layer 17, and the electronic component chip 1 is retained by an inner wall of the depression 17a located rearward in the direction of travel of the second plate 15. Thus, the electronic component chip 1 is reliably turned about the ridge 1c. The turning path of the electronic component chip 1 is a path α drawn by a ridge 1d located diagonally opposite the ridge 1c in FIG. 4. If the dimensions of the electronic component chip 1 to be turned are known, the path α can be easily determined, as the electronic component chip 1 has a substantially rectangular parallelepiped shape.

FIG. 8 is a graph showing a relationship between turning angle and travel distances in X-axis and Z-axis directions for realizing the turning path α determined as described above. Note that the travel distance in the X-axis direction is a distance by which the second plate 15 is moved in the planar direction by the planar movement mechanism 19, and the travel distance in the Z-axis direction is a distance by which the first plate 12 is moved in a vertical direction by the vertical movement mechanism 18.

By varying the travel distances in the X-axis and Z-axis directions as shown in FIG. 8, the electronic component chips 1 each can be turned along the turning path α such that the turning angle indicated by the horizontal axis is realized.

Figure 1C:
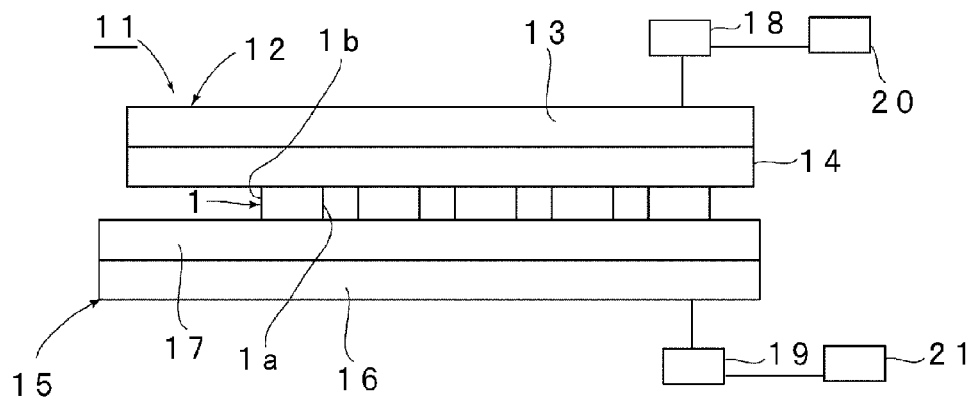
FIG. 1C is a schematic front view illustrating the electronic component chips after they are turned about 90 degrees.

The vertical movement mechanism 18 and the planar movement mechanism 19 are driven to move the first and second plates 12 and 15 such that the electronic component chips 1 each are turned along the turning path α determined as described above. The electronic component chips 1 each can thus be reliably turned about 90 degrees about the ridge 1c. After being turned about 90 degrees, the electronic component chips 1 are positioned as illustrated in FIG. 1C. Since the first and second plates 12 and 15 are moved to turn the electronic component chips 1 along the turning path α, the electronic component chips 1 are reliably held between the first and second plates 12 and 15.

To more reliably turn the electronic component chips 1 along the turning path α, it is preferable to detect a torque of a motor included in each of the vertical movement mechanism 18 and the planar movement mechanism 19 and control the travel distances of the first and second plates 12 and 15.

If the dimensions of the electronic component chips 1 are known, the first and second plates 12 and 15 can be moved to turn the electronic component chips 1 along the turning path α. Here, the travel distances of the first and second plates 12 and 15 are proportional to torque values of the motors included in the vertical movement mechanism 18 and the planar movement mechanism 19. Therefore, it is preferable that torque detecting mechanisms 20 and 21 be connected to the vertical movement mechanism 18 and the planar movement mechanism 19, respectively, to detect torque values of the motors.

Figure 5:
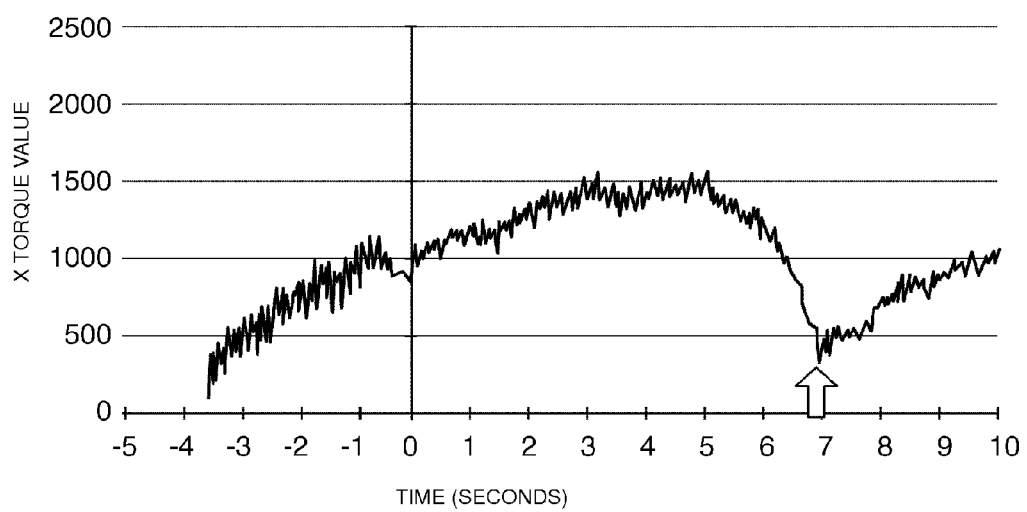
FIG. 5 is a graph showing temporal changes in torque value of a motor of a vertical movement mechanism according to the preferred embodiment of the present invention.

FIG. 5 is a graph showing temporal changes in torque value of the vertical movement mechanism 18. As shown in FIG. 5, the torque value of the motor changes as the electronic component chips 1 turn. The changes in torque value have a correlation to the turning path α when the electronic component chips 1 are turned along the turning path α.

Therefore, if changes in detected torque value do not coincide with changes in torque value determined in advance for realizing the turning path α, the output of the motor in the vertical movement mechanism 18 can be adjusted to achieve changes of the torque value determined in advance for realizing the turning path α.

Thus, by detecting the torque value of the motor and adjusting the output of the motor in accordance with the detected torque value, it is possible to turn the electronic component chips 1 such that the turning path α can be drawn with greater precision.

The graph of FIG. 5 shows changes in torque of the vertical movement mechanism 18. It is more preferable to also detect changes in torque of the planar movement mechanism 19 in a manner similar to that described above, so that changes in torque values of both the vertical movement mechanism 18 and the planar movement mechanism 19 can be used to control the turning path α of the electronic component chips 1.

As described above, the electronic component chips 1 can be turned about 90 degrees to a position illustrated in FIG. 1C.

Figure 6:
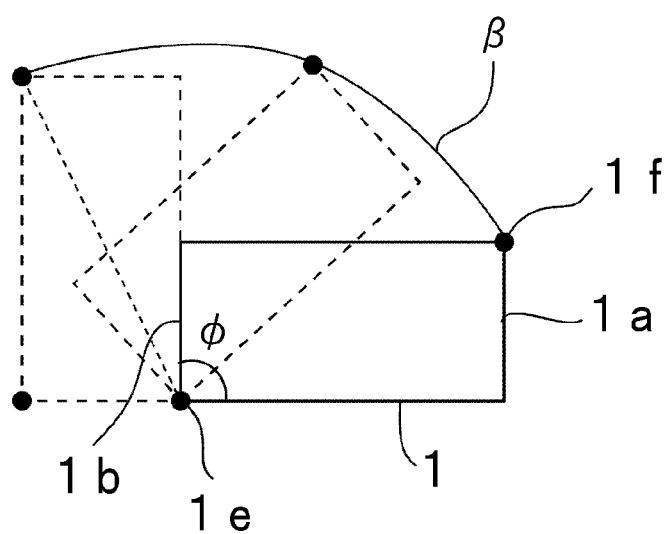
FIG. 6 is a schematic front view for explaining a step of turning the electronic component chip about 90 degrees after turning it about 90 degrees according to the preferred embodiment of the present invention.

In the description made with reference to FIG. 1A to FIG. 4, the electronic component chip 1 is turned to change an angle θ in FIG. 4 from about 90 degrees to about 0 degrees. In the present preferred embodiment, as illustrated in FIG. 6, the electronic component chip 1 is turned further to change an angle φ from about 0 degrees to about 90 degrees. In this case, a turning path β is drawn by a ridge 1f.

Figure 7A:
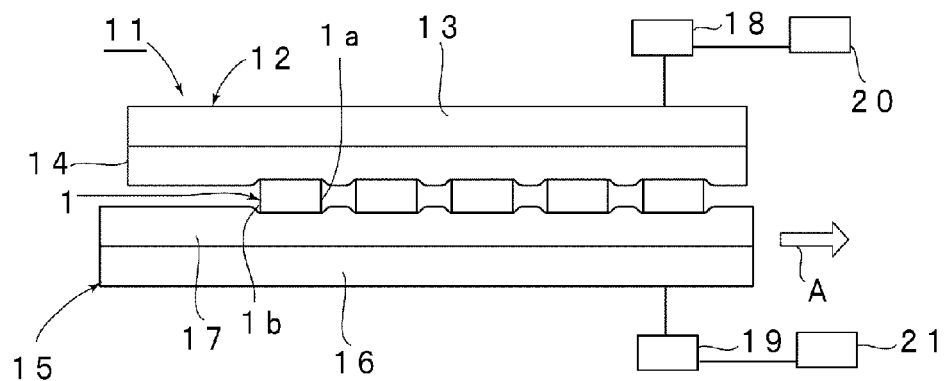
FIG. 7A to FIG. 7C are schematic front views for explaining a process in which electronic component chips having been turned about 90 degrees are further turned about 90 degrees in the electronic component manufacturing method according to the preferred embodiment of the present invention.

Specifically, as illustrated in FIG. 7A, the first plate 12 is lowered by the vertical movement mechanism 18 again to cause the electronic component chips 1 to dig into the first and second elastic layers 14 and 17. Next, the second plate 15 is slightly moved in the direction of arrow A. This travel distance is smaller than or equal to maximum elastic displacements of the first and second elastic layers 14 and 17. Again, protrusions and depressions are formed in the first and second elastic layers 14 and 17. The electronic component chips 1 each are thus reliably turned about a ridge 1e (see FIG. 6) in contact with the inner wall of the corresponding depression.

Figure 7B:
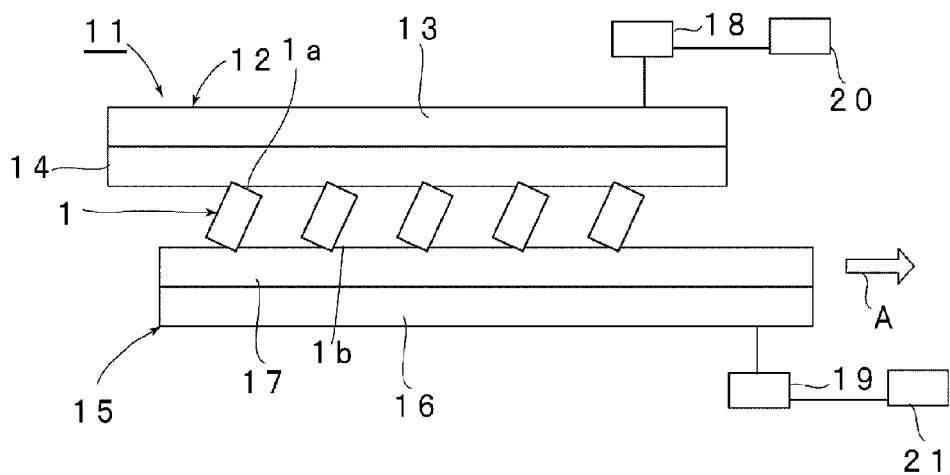
Figure 7C:
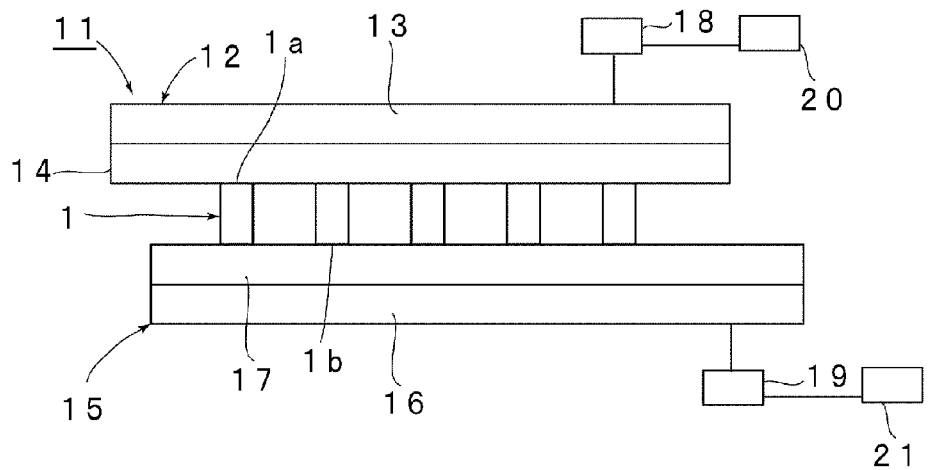

For turning the electronic component chips 1, the planar movement mechanism 19 is driven to further move the second plate 15 in the direction of arrow A. Additionally, the first plate 12 and the second plate 15 are moved by the vertical movement mechanism 18 and the planar movement mechanism 19, respectively, such that the turning path β illustrated in FIG. 6 is drawn. Thus, as illustrated in FIG. 7B and FIG. 7C, the electronic component chips 1 are turned to draw the turning path β, so that the angle φ can be changed from about 0 degrees to about 90 degrees. In other words, the electronic component chips 1 can be turned about 180 degrees from the initial state illustrated in FIG. 3A.

As described above, with the electronic component manufacturing method of the present preferred embodiment, the electronic component chips 1 can be reliably turned about 180 degrees.

Therefore, when the vertical movement mechanism 18 raises the first plate 12 from the position illustrated in FIG. 7C, the end faces 1b of the electronic component chips 1 can be exposed while the electronic component chips 1 are held on the lower surface of the first plate 12. Thus, a conductive paste can be easily applied to the end faces 1b of the electronic component chips 1.

As mentioned above, Japanese Unexamined Patent Application Publication No. 2010-141145 describes the fact that an electronic component chip is turned about 180 degrees, but does not describe in detail any specific method or apparatus for turning the electronic component chip about 180 degrees.

Figure 9A:
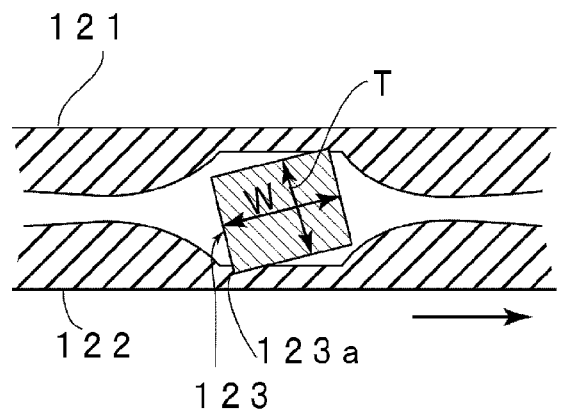
FIG. 9A and FIG. 9B are partial cutaway front cross-sectional views for explaining a problem with a method of related art in which an electronic component chip is held and turned between a pair of elastic layers.

As illustrated in FIG. 9A, if an electronic component chip 123 is simply held between elastic layers 121 and 122 facing each other and then, the elastic layer 122 is moved with respect to the elastic layer 121 in the planar direction as indicated by an arrow, cracking or chipping may occur in the electronic component chip 123. This tends to occur when a width W and a thickness T of the electronic component chip 123 differ from each other. This is because if the width W and the thickness T are different, the electronic component chip 123 cannot be easily turned further from the position illustrated in FIG. 9A. This may lead to occurrence of cracking or chipping in the electronic component chip 123.

Figure 9B:
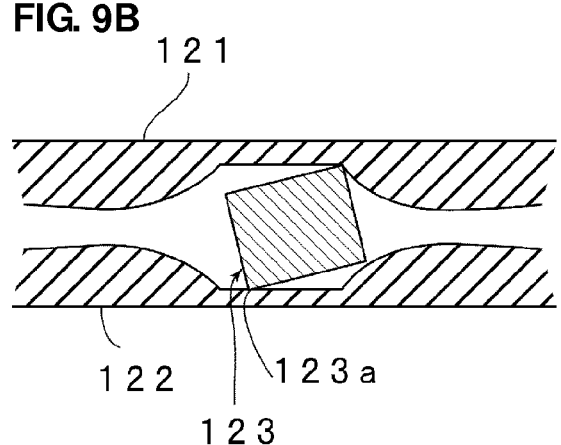

If the electronic component chip 123 is to be turned about 90 degrees or about 180 degrees, it may be possible to move the elastic layers 121 and 122 such that a turning path is drawn. However, as illustrated in FIG. 9B, if the electronic component chip 123 is simply held between the elastic layers 121 and 122 and if the elastic layers 121 and 122 are simply moved to realize such a turning path, the electronic component chip 123 may not be properly turned. This is because a ridge 123a about which the electronic component chip 123 is turned may not be firmly retained by the elastic layer 122 and may slide over the upper surface of the elastic layer 122.

Figure 9C:
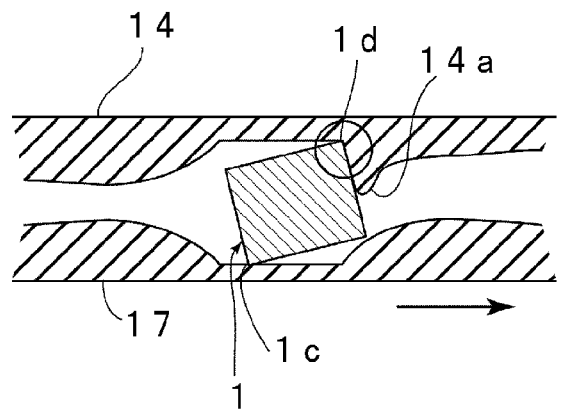
FIG. 9C is a schematic partial cutaway front cross-sectional view for explaining a step of turning an electronic component chip held between first and second elastic layers according to the preferred embodiment of the present invention.
Figure 10:
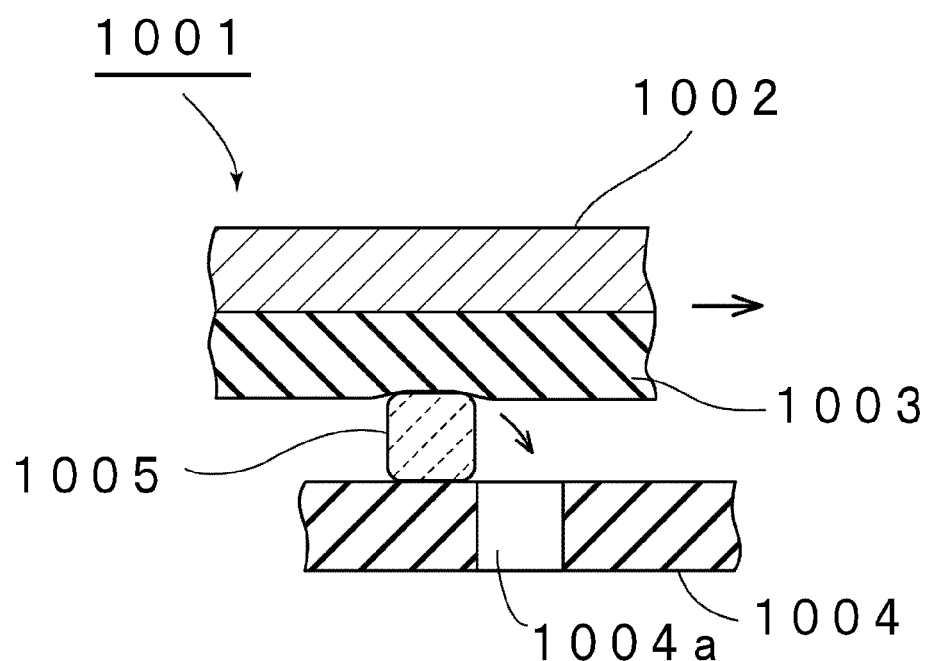
FIG. 10 is a partial cutaway front cross-sectional view for explaining a method for turning an electronic component chip according to an electronic component manufacturing method of related art.

In contrast to this, in the preferred embodiment described above, the electronic component chip 1 is pressed into contact with the first elastic layer 14 and the second elastic layer 17 in advance. Additionally, the first elastic layer 14 and the second elastic layer 17 are relatively moved in the planar direction, in advance, by a distance smaller than or equal to the maximum elastic displacements of the first and second elastic layers 14 and 17. Thus, since the first and second elastic layers 14 and 17 remain deformed as illustrated in FIG. 9C, the protrusion 14a is formed in the first elastic layer 14. Therefore, the ridge 1d of the electronic component chip 1 is retained by the protrusion 14a. At the same time, the ridge 1c is retained by the depression 17a. The electronic component chip 1 can thus be reliably turned about the ridge 1c. Therefore, in the present preferred embodiment, the electronic component chip 1 can be turned such that the turning path α or the turning path β is reliably drawn. It is thus possible to reliably turn the electronic component chips 1 by about 90 degrees or about 180 degrees.

As the size of the electronic component chips 1 decreases, it becomes more likely that cracking, chipping, or failure in turning of the electronic component chips 1 will occur with the method illustrated in FIG. 9A and FIG. 9B. In the present preferred embodiment, however, it is possible to reliably turn the electronic component chips 1 even if the size of the electronic component chips 1 decreases.

In the preferred embodiment described above, the second plate 15 is moved by the planar movement mechanism 19 in the planar direction with respect to the first plate 12. Alternatively, the first plate 12 may be moved in the planar direction with respect to the second plate 15, or both the first and second plates 12 and 15 may be moved in the planar direction. As long as the first and second plates 12 and 15 can be relatively moved in the planar direction, a method and a mechanism for moving the first and second plates 12 and 15 in the planar direction are not limited to specific ones.

Although the vertical movement mechanism 18 is connected to the first plate 12 in the preferred embodiment described above, the vertical movement mechanism 18 may be connected to the second plate 15 or to both the first and second plates 12 and 15. In other words, the vertical movement mechanism 18 and the planar movement mechanism 19 can be appropriately modified as long as they can move the first and second plates 12 and 15 such that the electronic component chips 1 are turned to draw a predetermined turning path.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An electronic component manufacturing method operatively associated with an electronic component manufacturing apparatus, the method comprising the steps of:

providing the apparatus including a first plate having a first elastic layer on one side thereof, a second plate having a second elastic layer on one side thereof, a planar movement mechanism configured to relatively move the first and second plates in a planar direction thereof in a state where at least one electronic component chip adhering, at one surface thereof, to the first elastic layer is held between the first and second elastic layers facing each other, and a vertical movement mechanism configured to move, in conjunction with the planar movement mechanism, at least one of the first and second plates in the planar direction and a vertical direction in accordance with a turning path of the electronic component chip turned between the first and second elastic layers, wherein the second elastic layer is in contact with a first ridge of the electronic component chip located at a rear of an end surface of the electronic component chip, with respect to a travel direction of the second plate during turning of the electronic component chip, and the turning path of the electronic component chip determined by the planar movement mechanism and the vertical movement mechanism is a path drawn by a second ridge of the electronic component chip located diagonally opposite the first ridge of the electronic component chip, when the electronic component chip is turned by the planar movement mechanism and the vertical movement mechanism about the first ridge of the electronic component chip;

preparing at least one electronic component chip including a first surface and a second surface opposite to each other;

holding the electronic component chip between the first and second plates such that the first and second surfaces are in contact with the first and second elastic layers, respectively; and turning the electronic component chip by relatively moving the first and second plates in the planar direction using the planar movement mechanism and moving the first and second plates in accordance with a turning path of the electronic component chip using the planar movement mechanism and the vertical movement mechanism.

2. The electronic component manufacturing method according to claim 1, further comprising the steps of:

before relatively moving the first and second plates in the planar direction, bringing the first and second plates closer to each other by driving the vertical movement mechanism such that the first and second surfaces of the electronic component chip dig into the first and second elastic layers, respectively;

relatively moving the first and second plates in the planar direction by a predetermined distance smaller than or equal to maximum displacements of the first and second plates in the vertical direction, the displacements being made when the first and second plates are brought closer to each other; and after relatively moving the first and second plates in the planar direction by the predetermined distance, turning the electronic component chip using the planar movement mechanism and the vertical movement mechanism such that the electronic component chip is turned along the turning path of the electronic component chip.

3. The electronic component manufacturing method according to claim 1, wherein in the step of providing the apparatus, the planar movement mechanism and the vertical movement mechanism are configured to each include a motor as a drive source, and to each detect a torque of the motor using a detecting mechanism.

\* \* \* \* \*